(12) United States Patent
Rueckel et al.

(10) Patent No.: US 10,781,926 B2
(45) Date of Patent: Sep. 22, 2020

(54) VALVE BODY AND METHOD FOR PRODUCING THE VALVE BODY

(71) Applicant: GEMUE GEBR. MUELLER APPARATEBAU GmbH & Co. KOMMANDITGESELLSCHAFT, Ingelfingen (DE)

(72) Inventors: Thomas Rueckel, Lucerne (CH); Jean-Claude Rudolf, Cham (CH)

(73) Assignee: GEMUE GEBR. MUELLER APPARATEBAU GmbH & Co. KOMMANDITGESELLSCHAFT, Ingelfingen (DE)

( * ) Notice: Subject to any disclaimer, the term of this patent is extended or adjusted under 35 U.S.C. 154(b) by 14 days.

(21) Appl. No.: 16/092,942

(22) PCT Filed: Mar. 10, 2017

(86) PCT No.: PCT/EP2017/055742
§ 371 (c)(1),
(2) Date: Oct. 11, 2018

(87) PCT Pub. No.: WO2017/178163
PCT Pub. Date: Oct. 19, 2017

(65) Prior Publication Data
US 2019/0063621 A1 Feb. 28, 2019

(30) Foreign Application Priority Data
Apr. 12, 2016 (DE) .................. 10 2016 106 724

(51) Int. Cl.
*B29C 65/16* (2006.01)
*F16K 7/12* (2006.01)
(Continued)

(52) U.S. Cl.
CPC ............ *F16K 7/12* (2013.01); *B29C 65/1616* (2013.01); *B29C 65/1635* (2013.01);
(Continued)

(58) Field of Classification Search
CPC ............ B29C 65/1616; B29C 65/1635; B29C 65/7841; F16K 7/12; F16K 27/0236
See application file for complete search history.

(56) References Cited

U.S. PATENT DOCUMENTS

2011/0308655 A1   12/2011   Keeper et al.
2012/0048837 A1   3/2012   Bleicher et al.
(Continued)

FOREIGN PATENT DOCUMENTS

CN    102421564 A    4/2012
CN    105422904 A    3/2016
(Continued)

OTHER PUBLICATIONS

Translation of DE 102006010956 (Year: 2019).*
(Continued)

*Primary Examiner* — Kelsey E Cary
(74) *Attorney, Agent, or Firm* — Bond Schoeneck & King, PLLC; George McGuire

(57) ABSTRACT

The invention relates to a valve body including a membrane which cooperates with a valve seat, wherein the valve body and the membrane are connected to each other in the region of a laser weld seam in a bonded and fluid-tight manner.

7 Claims, 5 Drawing Sheets

Figure 1:
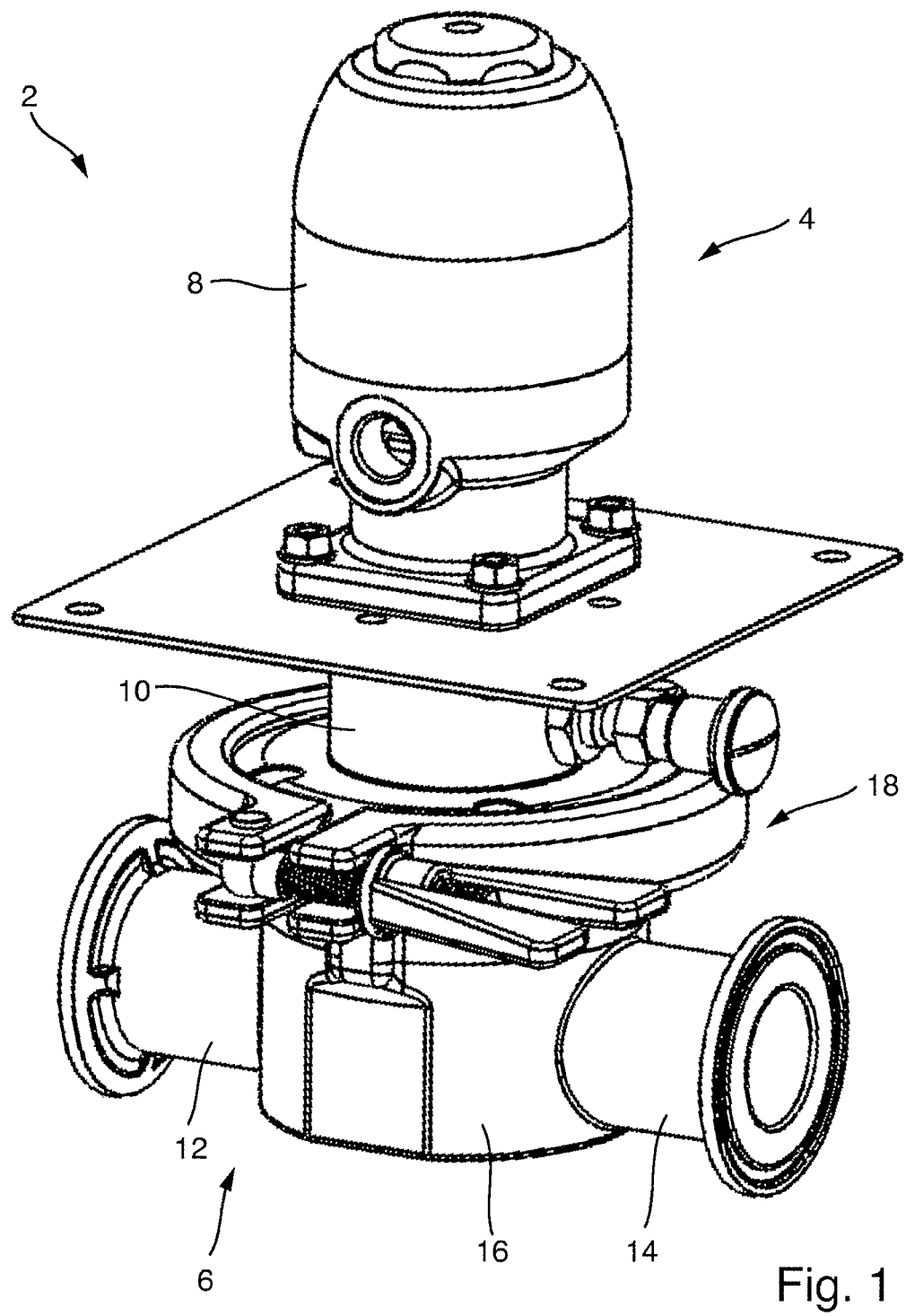

(51) Int. Cl.
  *B29C 65/78* (2006.01)
  *F16K 27/02* (2006.01)
  *B29L 31/00* (2006.01)
(52) U.S. Cl.
  CPC ...... *B29C 65/7841* (2013.01); *F16K 27/0236* (2013.01); *B29L 2031/7506* (2013.01)

(56) References Cited

U.S. PATENT DOCUMENTS

| | | | |
|---|---|---|---|
| 2014/0131609 A1 | 5/2014 | Perner et al. | |
| 2014/0158923 A1* | 6/2014 | Wolpert | F16K 7/126 251/331 |
| 2015/0231870 A1 | 8/2015 | Dannenberg et al. | |

FOREIGN PATENT DOCUMENTS

| | | |
|---|---|---|
| DE | 10238585 B3 | 4/2004 |
| DE | 102006010956 A1 | 9/2007 |
| DE | 102009020272 A1 | 11/2010 |
| DE | 102011076260 A1 | 11/2012 |
| DE | 102011084075 A1 | 1/2013 |
| DE | 102013104599 B3 | 3/2014 |
| DE | 102014202919 A1 | 8/2015 |
| DE | 102014209473 A | 11/2015 |
| EP | 2801471 B3 | 6/2016 |
| WO | 05070610 A1 | 4/2005 |
| WO | 2015176947 A1 | 11/2015 |

OTHER PUBLICATIONS

International Search Report and Written Opinion Form PCT/ISA/220 and PCT/ISA/237, International Application No. PCT/EP2017/055742, pp. 1-9, International Filing Date Mar. 10, 2017, dated Jun. 12, 2017.

Non-translated German Exam Report, pp. 1-5, Application No. 10 2016 106 724.5 dated Sep. 26, 2016.

Non-translated International Report on Patentability Form PCT/IPEA/409, pp. 1-10, dated Jun. 6, 2018.

Non-translated Chinese Office Action dated Jul. 3, 2019, pp. 1-8.

Non-translated Chinese Office Communication, dated Mar. 2, 2020, pp. 1-17.

* cited by examiner

VALVE BODY AND METHOD FOR PRODUCING THE VALVE BODY

CROSS-REFERENCE TO RELATED APPLICATIONS

This application is the United States National Phase Application of PCT Application No. PCT/EP2017/055742, filed Mar. 10, 2017, which claims priority to German patent application No. DE 102016106724.5, filed on Apr. 12, 2016, the entire disclosure of each of which is incorporated herein by reference.

The invention relates to a valve body and to a method for producing the valve body.

It is known to connect a valve body and a membrane by means of ultrasonic welding.

The problem of the prior art is solved by a valve body and by a method for producing the valve.

It is therefore proposed, according to a first aspect, that the valve body and a membrane are connected to each other in the region of a laser weld seam in a bonded and fluid-tight manner. The membrane is therefore captively and irreversibility connected to the valve body. As a result, the laser weld seam can be provided without the addition of aggregates in the form of absorbing pigments. This also achieves reduced formation of particles in the region of the laser weld seam and thereby ensures reliable medium tightness.

Furthermore, it is not necessary to provide specific geometry for producing the laser weld seam. Instead, a parallel arrangement of the surfaces to be connected can be sufficient, which advantageously affects the amount of space required for the laser weld seam.

In an advantageous embodiment, the membrane is substantially transparent to laser light having a wavelength, the valve body substantially absorbing laser light having the same wavelength. This guarantees that the laser weld seam is produced between the membrane and the valve body.

In an advantageous embodiment, the material of the valve body comprises polypropylene and/or polyethylene. The material of the membrane comprises a thermoplastic elastomer. This combination of materials is suitable in particular for producing the laser weld seam.

In an advantageous embodiment, the membrane is arranged inside a recess for a thrust piece of a valve drive. This in particular ensures that the membrane is correctly positioned before the laser weld seam is produced. Furthermore, an element, such as the thrust piece, that actuates the membrane may be arranged in the recess so as to be protected.

A further aspect relates to the method for producing the valve body, the valve body and the membrane being connected to each other in the region of the laser weld seam in a bonded and fluid-tight manner.

In an advantageous embodiment, the membrane is introduced into a recess of the valve body. The membrane is subsequently pressed against a contact surface of the valve body by means of a pressing device. It can therefore be guaranteed, before the laser weld seam is produced, that the bonded connection is produced when the region between the membrane and the valve body is heated.

In an advantageous embodiment, the pressing device is substantially transparent to laser light for producing the laser weld seam. The laser light can therefore advantageously penetrate, unobstructed, as far as the planned connection portion and the necessary contact pressure can simultaneously be guaranteed.

In an advantageous embodiment, a connecting portion between the membrane and the valve body is irradiated with laser light by means of a joining laser, the laser light being substantially transmitted by the membrane and absorbed in the connecting region. The transmission of the laser light through the membrane in particular prevents the membrane outside the laser weld seam from being destroyed or damaged.

Figure 2:
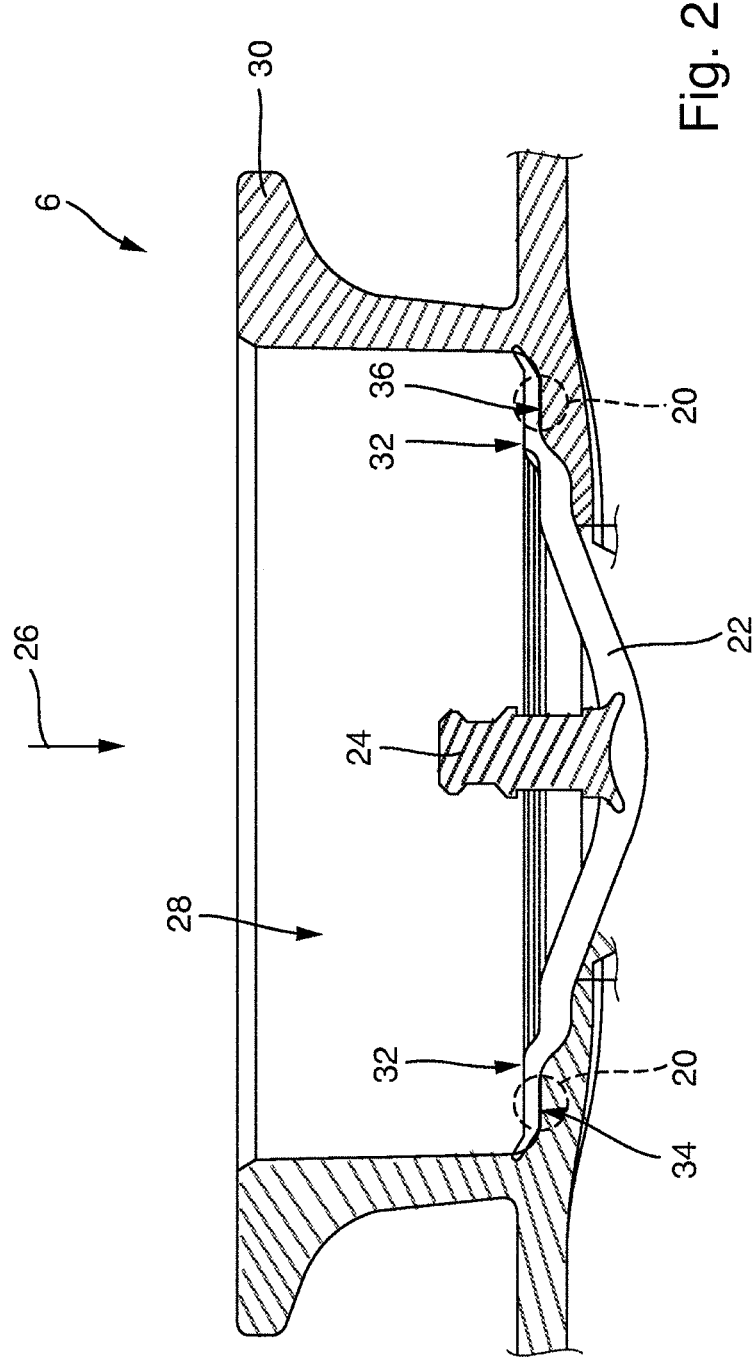
Figure 3:
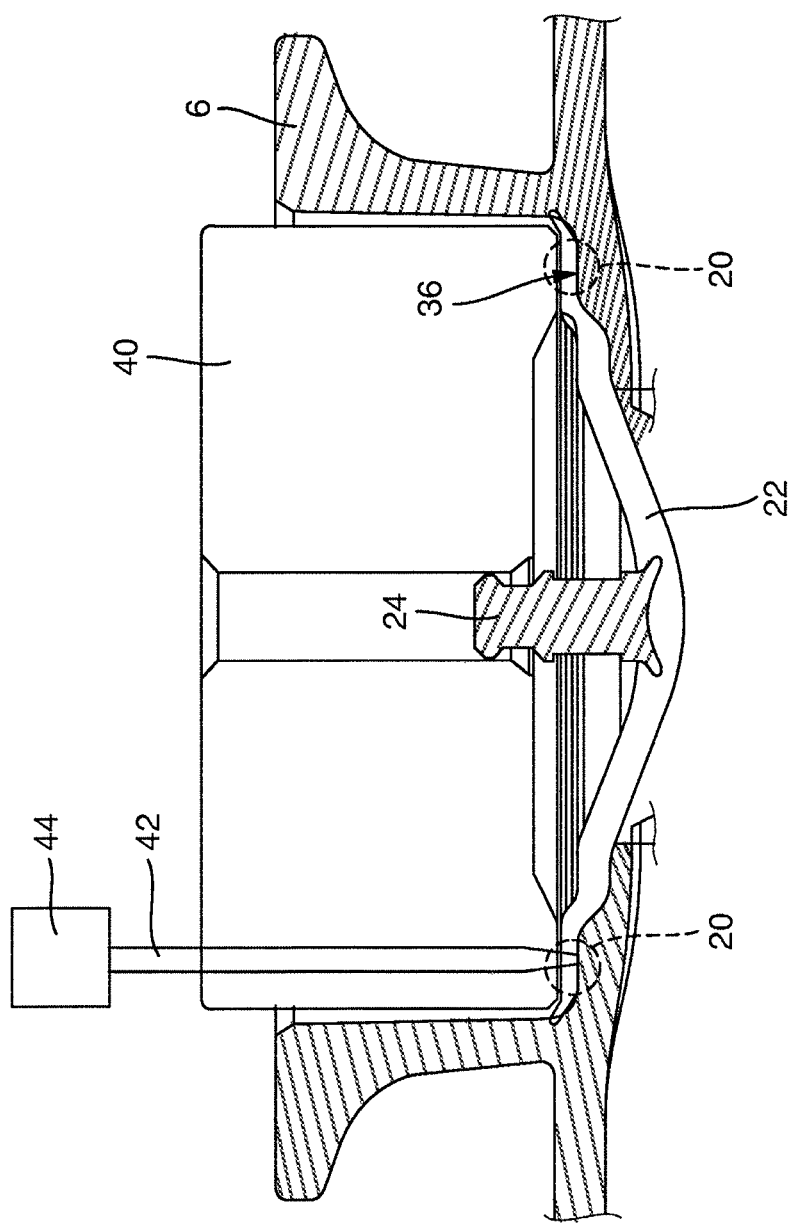
Figure 4:
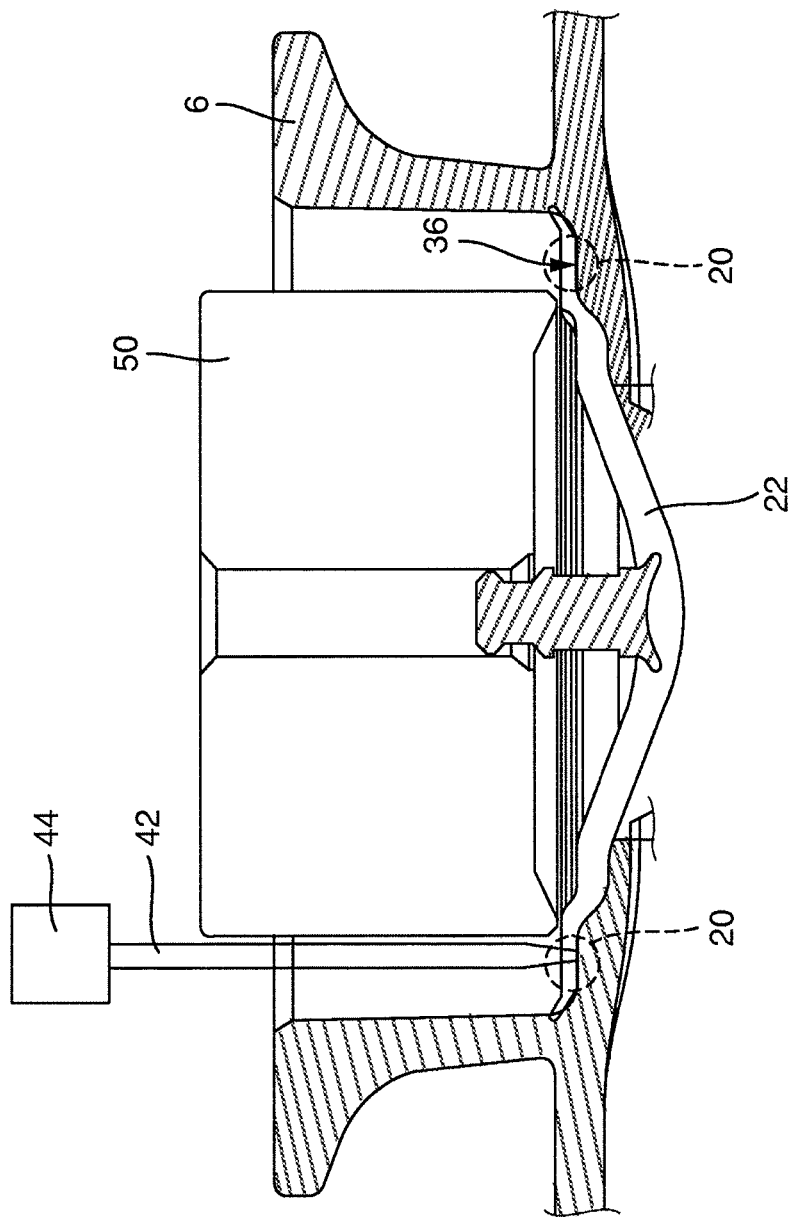
Figure 5:
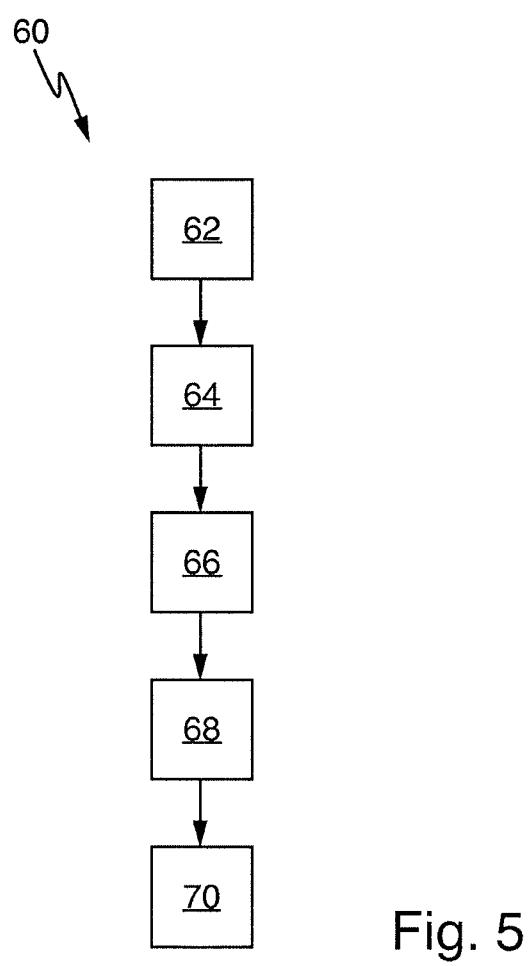

Further features, possible uses and advantages of the invention can be found in the following description of embodiments of the invention, which are shown in the figures of the drawings. In all the drawings, even in different embodiments, the same reference signs are used for functionally equivalent values and features. The exemplary embodiments of the invention are explained in the following with reference to the drawings, in which:

FIG. 1 is a perspective view of a valve assembly;
FIG. 2 is a schematic sectional view of a valve body;
FIGS. 3 and 4 are each a schematic sectional view of a manufacturing step for producing the valve body; and
FIG. 5 is a schematic flow diagram.

FIG. 1 is a perspective view of a valve assembly 2 comprising a valve drive 4 and a valve body 6, which may be designed in particular as a one-way valve body. The valve drive 4 comprises inter alia a drive unit 8 and an intermediate piece 10. The valve body 6 comprises supply points 12 and 14, through which the fluid to be provided can be supplied to a control portion 16 or can be transported away therefrom. The intermediate piece 10 and the valve body 6 are secured to each other by means of a clamping device 18.

FIG. 2 is a schematic sectional view of the valve body 6. A membrane 22 cooperates with a valve seat (not shown) in order to close the control portion 16, which valve seat is part of the valve body 6 in the region of the control portion 16. Furthermore, the membrane 22 is pressed against the valve seat in the feed direction 26 by a thrust piece (not shown) that is driven by the drive unit 8, in order to close the control portion 16. Furthermore, the membrane 22 comprises a membrane pin 24 that is provided in particular for opening the control portion 16 counter to the feed direction 26. The membrane pin 24 is preferably cast with the membrane 22.

In a substantially annular connecting portion 20, the valve body 6 and the membrane 22 are connected to each other in a bonded and fluid-tight manner by means of a laser weld seam. The valve body 6 and the membrane 22 are therefore connected to each other in the region of a circular laser weld seam in a bonded and fluid-tight manner. Of course, the laser weld seam and the connecting portion 20 may also have a shape that is not annular. The membrane 22 is, at least in the region of the connecting region 20, substantially transparent to laser light having a wavelength, the valve body 6 substantially absorbing laser light having the same wavelength at least in the region of the connecting region 20. The material of the valve body 6 comprises polypropylene and/or polyethylene. The material of the membrane 22 comprises a thermoplastic elastomer, TPE.

The valve body 6 comprises a recess 28, in which in particular the thrust piece can be received. Furthermore, the recess 28 comprises contact regions for the membrane 22, in particular in the connecting portion 20. An annular surface 32 of the membrane 22 that is oriented counter to the feed direction 26 is arranged in the connecting portion 20 substantially in parallel with a contact surface 34 of the membrane 22 and in parallel with a contact surface 36 of the valve body 6, in order to reduce or prevent refraction of the laser light for producing the laser weld seam.

Outside the recess 28, the valve body 6 comprises an annular clamping portion 30 for clamping the valve body 6 to the intermediate piece 10.

FIG. 3 is a schematic sectional view of a manufacturing step for producing the valve body 6. A pressing device 40 presses the membrane 22 against the contact surface 36 of the valve body 6 in the connecting region 20. For this purpose, the membrane 22 was previously introduced into the recess 28 of the valve body 6. The membrane 22 is subsequently pressed against the contact surface 36 of the valve body 6 by means of the pressing device 40.

The pressing device 40 is substantially transparent to laser light according to a schematically shown laser beam 42, which is generated by a joining laser 44. This means that light having the wavelength of the laser beam 42 is transmitted from the pressing device 40 into the connecting region 20. Furthermore, the surfaces for the entry and exit of the laser beam 42 are substantially in parallel with the contact surfaces 36 and 34 and with the surface 32, in order to reduce or prevent refraction of the laser light.

The membrane 22 also transmits the laser light of the laser beam 42. In the region of the contact surface 36, the laser light of the laser beam 42 is absorbed by the material of the valve body 6, which leads to an increase in temperature and a corresponding bonded and fluid-tight connection between the material of the membrane 22 and the material of the valve body 6.

By moving the joining laser 44 or by moving the assembly comprising the membrane 22, the valve body 6 and the pressing device 40, the laser beam 42 is guided along a circular path along the connecting portion 20, whereby the connecting portion is irradiated with laser light by means of the joining laser 44. The pressing device 40 consists in particular of quartz glass.

The wavelength of the laser light, which is emitted from the joining laser 44 according to the laser beam 42, is in the range between 1400 and 2500 nm, in particular in the range of 1800-2000 nm, more particularly in the range of around 1900 nm. Advantageously, for these wavelength ranges, when TPE is used for the membrane 22 and PP is used for the valve body 6, a fluid-tight connection between the membrane 22 and the valve body 6 in the context of the laser weld seam can easily be produced. Therefore, two almost opaque components can be laser-welded according to the principle of self-absorption of the respective material. This means that the wavelength of the laser light is adjusted to the material properties and molecular vibrations of the material such that the laser weld seam can be produced. In particular, the membrane 22 and the valve body 6 do not contain any aggregates that promote absorption of laser light in the range of the above-mentioned wavelengths. The membrane 22 can therefore also be referred to as a membrane that is free of absorbent aggregates and the valve body 6 can also be referred to as a valve body that is free of absorbent aggregates. This lack of aggregates is significant in particular for uses in the field of biology or health, as the valve body does not allow any substance to secrete into the provided fluid.

FIG. 4, in contrast to FIG. 3, shows a pressing device 50, which does not necessarily have to be transparent. Instead, the pressing device 50 presses the membrane 22 against the contact surface 36 such that there is sufficient contact pressure between the membrane 22 and the valve body 6 in the connecting region 20 and the laser beam 42 simultaneously directly strikes the surface 32 of the membrane 22 without passing through the pressing device 50.

FIG. 5 is a schematic flow diagram 60. In a first step 62, the valve body 6 is secured in a device of a production facility. In a second step 64, the membrane 22 is positioned at the desired position inside the recess 28. In a third step 66, the pressing device 40 is inserted into the recess 28, in order to press the membrane 22 against the contact surface 36 with a minimum contact pressure. In a fourth step 68, the laser beam 42 is directed to the connecting region 20 by means of the joining laser 44, such that the laser beam 42 completely passes through the annular connecting portion 20 at least once. In a fifth step 70, the pressing device 40 is removed and the laser welding process is completed. The valve body 6 and the membrane 22 are therefore connected to each other in the region of the circular laser weld seam in a bonded and fluid-tight manner.

What is claimed is:

1. Valve body comprising a membrane which cooperates with a valve seat, the valve body and the membrane being connected to each other in the region of a laser weld seam in a bonded and fluid-tight manner, characterized in that
    the membrane and the valve body are free of absorbent aggregates,
    a material of the valve body comprises polypropylene and/or polyethylene, and
    a material of the membrane comprises a thermoplastic elastomer, and
    the membrane is arranged inside a recess of the valve body for a thrust piece of a valve drive, and a contact surface of the valve body contacting with the membrane is flat.

2. Valve body according to claim 1, wherein the membrane is substantially transparent to laser light having a wavelength, and wherein the valve body substantially absorbs laser light having the same wavelength.

3. Valve assembly comprising a valve body comprising a membrane which cooperates with a valve seat, the valve body and the membrane being connected to each other in the region of a laser weld seam in a bonded and fluid-tight manner, characterized in that
    the membrane and the valve body are free of absorbent aggregates,
    a material of the valve body comprises polypropylene and/or polyethylene, and
    a material of the membrane comprises a thermoplastic elastomer, and
    the membrane is arranged inside a recess of the valve body for a thrust piece of a valve drive, and a contact surface of the valve body contacting with the membrane is flat, and a valve drive having a thrust piece which cooperates with the membrane.

4. Method for producing a valve body comprising a membrane which cooperates with a valve seat, comprising the steps of connecting_the valve body and the membrane to each other in the region of a laser weld seam in a bonded and fluid-tight manner,
    providing the membrane and the valve body such that they_are free of absorbent aggregates,
    providing a material of the valve body that comprises polypropylene and/or polyethylene, and
    providing a material of the membrane that comprises a thermoplastic elastomer, and
    arranging the membrane inside a recess of the valve body for a thrust piece of a valve drive, and a contact surface of the valve body contacting with the membrane is flat.

5. Method according to claim 4, comprising the step of introducing the membrane is into the recess of the valve body, and pressing the membrane against a contact surface of the valve body by means of a pressing device.

6. Method according to claim 5, provising for the pressing device to be substantially transparent to laser light for producing the laser weld seam.

7. Method according to claim 5, comprising the step of irradiating a connecting portion between the membrane and the valve body with laser light by means of a joining laser, wherein the laser light is substantially transmitted from the membrane and is absorbed in the connecting portion.

\* \* \* \* \*